ns) United States Patent
Mayr (10) Patent No.: US 11,022,686 B2
(45) Date of Patent: Jun. 1, 2021

(54) APPARATUS AND METHOD FOR DETERMINING A SPATIAL POSITION OF A TRANSMITTER (71) Applicant: Rohde & Schwarz GmbH & Co. KG, Munich (DE)

(72) Inventor: Bernhard Mayr, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 307 days.

(21) Appl. No.: 16/039,758

(22) Filed: Jul. 19, 2018

(65) Prior Publication Data

US 2020/0025900 A1  Jan. 23, 2020

(51) Int. Cl.
G01S 13/50 (2006.01)
G01S 13/46 (2006.01)
G01S 3/802 (2006.01)

(52) U.S. Cl.
CPC .......... G01S 13/505 (2013.01); G01S 3/8022 (2013.01); G01S 13/46 (2013.01)

(58) Field of Classification Search
CPC ... G01S 13/505; G01S 13/46; G01S 2013/468
USPC ..................... 342/780, 78, 357.78
See application file for complete search history.

(56) References Cited

U.S. PATENT DOCUMENTS

| 6,272,072 B1* | 8/2001 | Wulich | G01S 3/8022 367/118 |
| 6,677,900 B1* | 1/2004 | Thouvenel | G01S 13/003 342/104 |
| 2012/0130248 A1* | 5/2012 | Fatemi | A61B 8/06 600/454 |
| 2014/0240170 A1* | 8/2014 | Rudow | G01S 19/42 342/357.42 |
| 2016/0227462 A1* | 8/2016 | Axmon | H04W 36/32 |
| 2017/0257877 A1* | 9/2017 | Axmon | H04W 88/085 |
| 2018/0206075 A1* | 7/2018 | Demirdag | H04W 4/027 |
| 2019/0029636 A1* | 1/2019 | Lee | A61B 8/14 |

FOREIGN PATENT DOCUMENTS

| JP | 2017156102 A | 9/2017 | |
| WO | WO-03027706 A1 * | 4/2003 | ........... B61L 25/026 |
| WO | WO-2011047709 A1 * | 4/2011 | ............... G01S 5/12 |
| WO | WO-2014131894 A2 * | 9/2014 | .......... G01S 15/876 |
| WO | 2017150323 A1 | 9/2017 | |
| WO | WO-2017150323 A1 * | 9/2017 | ............... G01S 5/04 |

* cited by examiner

Primary Examiner — Vladimir Magloire
Assistant Examiner — Alexander L. Syrkin
(74) Attorney, Agent, or Firm — Westman, Champlin & Koehler, P.A.

(57) ABSTRACT

A determination of a spatial position of a transmitter which emits a wireless signal is provided. A receiver which moves relative to the transmitter receives the wireless signal and analyses a Doppler shift in the received signal. Information is generated for specifying possible spatial positions of the transmitter based on a point of time when a sign in the Doppler shift changes. In this way, a very simple and efficient determination of possible locations of the transmitter can be achieved.

18 Claims, 4 Drawing Sheets

APPARATUS AND METHOD FOR DETERMINING A SPATIAL POSITION OF A TRANSMITTER

TECHNICAL FIELD

The present invention relates to an apparatus and for determining a spatial position of a transmitter. The present invention further relates to a method for determining a spatial positions of a transmitter. In particular, the present invention relates to determining a spatial position of a moving transmitter emitting a wireless signal.

BACKGROUND

Although applicable in principal to any transmitter emitting a wireless signal, the present invention and its underlying problem will be hereinafter described in combination with a communication device emitting a wireless radio frequency signal.

The number of wireless communication devices continuously increases. Since wireless communication devices usually emit wireless radio frequency signals, the emission of these wireless signals may be used to locate a spatial position of the respective communication device.

For this purpose, many different approaches for locating a device emitting wireless signals are known. For example, an angel of arrival (AOA), or a time difference of arrival (TDOA) may be determined from multiple different spatial positions, and a position of a wireless device may be estimated by triangulation.

However, identifying a direction of a device emitting wireless signals may be relative complex. Thus, complex and expensive hardware is required for locating a spatial position of a device emitting wireless signals.

Against this background, the problem addressed by the present invention is to provide a simple determination of information for identifying a spatial position of a device emitting wireless signals.

SUMMARY

The present invention solves this problem with an apparatus and a method comprising the features of the independent claims. Further advantageous embodiments are subject matter of the independent claims.

According to a first aspect, the present invention provides an apparatus for determining a spatial position of a transmitter. The transmitter may move relative to the apparatus, and the transmitter may emit a wireless signal. The apparatus comprises a receiver, a signal processor, a position acquisition device and a position estimator. The receiver is adapted to receive the wireless signal emitted by the transmitter. The signal processor is adapted to determine a Doppler shift in the received signal. The signal processor is further adapted to identify a change of sign in the determined Doppler shift. The position acquisition device is adapted to acquire navigation data relating to a position and/or a movement of the apparatus at a point of time when the sign in the determined Doppler shift changes. The position estimator is adapted to compute information relating to the spatial position of the transmitter with respect to the position of the apparatus based on the acquired navigation data.

According to a further aspect, a method for determining a spatial position of a transmitter is provided. The transmitter may move relative to the apparatus, and may emit a wireless signal. The method comprises a step of receiving, by a receiver, the wireless signal emitted by the transmitter. The method further comprises determining a Doppler shift in the received signal, and identifying a change of sign in the determined Doppler shift by a signal processor. The method further comprises acquiring, by a position acquisition device, navigation data relating to a position and/or a movement of the apparatus at a point of time when the sign in the determined Doppler shift changes. Further, the method comprises computing information relating to the spatial position of the transmitter with respect to the position of the apparatus based on the acquired navigation data by a position estimator.

The present invention is based on the fact that a change of sign in a Doppler shift may be used for determining a position of a transmitter with respect to a moving receiver. In particular, the transmitter may be located perpendicular to a moving vector of a receiver at the time when the sign of the Doppler shift changes.

The present invention therefore tries to achieve a simple and efficient determination of the spatial relationship between a receiver and a transmitter of wireless signals by simply analyzing the sign of a Doppler shift. Since only the sign of the Doppler shift has to be analyzed, the orientation of the transmitter with respect to a moving receiver can be determined in a very simple and efficient way. Thus, the required hardware and the computational effort can be reduced. In this way, the cost for determining the orientation of the transmitter with respect to the moving receiver can be reduced and the volume and to weight of the system can be minimized.

A Doppler shift of a signal may be the difference between a frequency of the signal at the transmitter and a frequency of the signal at the receiver. In case a distance between the transmitter and the receiver is continuously changing, e.g. the receiver is moving towards the transmitter or the receiver is moving away from the transmitter, the frequency measured at the receiver may be different from the frequency of the signal at the transmitter. This effect is known as so-called Doppler Effect. Accordingly, the difference between the frequencies can be described by a so-called Doppler shift.

In particular, as long as the transmitter and/or the receiver is moving in such a way that the difference between the transmitter and the receiver decreases, the frequency at the receiver is higher than the frequency at the transmitter. In this case, the Doppler shift is negative. In case the transmitter and receiver is moving such that the difference between the transmitter and the receiver increases, the frequency of the receiver is lower than the frequency of the transmitter. In this case, the Doppler shift is positive. As can be seen from this, the sign in the Doppler shift changes when the distance between the transmitter and receiver is smallest. In this situation, the transmitter is located on a plane which is perpendicular to the moving direction of the receiver. This information may be used in order to determine a position of the transmitter with respect to the position of the receiver.

The above identified approach of analyzing the Doppler shift for obtaining information for locating a transmitter may be applied to any kind of wireless signal having a predetermined frequency. For example, the above identified approach may be applied to acoustic signals comprising sonic of ultrasonic waves, to radio-frequency signals such as electromagnetic waves, or even optical signals, in particular pulsed optical signals, e.g. signals being modulated with predetermined frequency.

Accordingly, the receiver of the apparatus for determining a spatial position may be any kind of appropriate receiver for receiving the respective wireless signal. For example, in case the wireless signal is an acoustic signal, the receiver may comprise a microphone or another sensor for receiving the acoustic waves. In case the wireless signal is an optical signal, the optical signal may be received by an appropriate sensing device such as an optical sensor or the like. Furthermore, the receiver may also comprise an antenna for receiving electromagnetic waves of a wireless radio frequency signal. Such an antenna may be any kind of appropriate antenna, for example an omnidirectional antenna. However, any other kind of appropriate antenna of receiving element may be also possible.

Furthermore, the receiver may comprise analogue or digital elements for processing the received wireless signal. For example, the receiver may comprise an amplifier or an attenuator for adapting the magnitude of the received signal. Furthermore, the receiver may comprise filter elements like a high-pass filter, a low-pass filter or a bandpass filter for limiting the frequency range of the received signal. However, it is understood, that receiver may also comprise any other kind of appropriate element for adapting the received wireless signal. In particular, the receiver may comprise interfacing elements for forwarding the received wireless signal to further components, in particular to the signal processor.

The Doppler shift may be determined as already described above. In particular, the Doppler shift may be determined by comparing a frequency of the received signals with a predetermined frequency which may be the expected frequency at the transmitter. For example, the expected frequency at the transmitter may be determined to a specific frequency, e.g. a frequency related to particular transmission. Furthermore, in case a transmission may be applied by using a frequency of one or more predetermined frequency channels, the expected frequency may be selected to the frequency of the corresponding channel. It may be also possible that the frequency at the transmitter may be provided by an external signaling. For example, the frequency may be specified by data included in the received wireless signal or by any other kind of data which may be received by a wireless or wired communication link. Furthermore, the frequency of the signal at the transmitter may be also read out from a look up table stored in a memory of the apparatus, in particular a memory of the signal processor.

The navigation data which are acquired by the position acquisition device may be any kind of appropriate data for specifying a spatial position and/or a movement of the apparatus. For example, the navigation data may comprise a vector for specifying a direction of movement of the apparatus in a three-dimensional or a two-dimensional space. As already described above, based on the knowledge of such a movement vector, it can be assumed that the transmitter is located on a plane perpendicular to this vector at the point of time when the sign in the Doppler shift changes. In case the determination of the spatial position is performed on a two-dimensional plane, the transmitter may be located on the line perpendicular to the two-dimensional movement vector at the point of time when the sign in the Doppler shift changes. Thus, by computing such a plane or line, it is possible to obtain information relating to the spatial position of the transmitter. By combining multiple of these planes or lines, the spatial position of the transmitter may be identified.

In order to determine the spatial position of the transmitter, the information computed by the position estimator may be used. In particular, for each change in the sign of the Doppler shift, the position estimator may compute a corresponding plane or line on which the transmitter is expected to be located. For this purpose, the position estimator may compute information for specifying the plane or the line on which the transmitter is to be expected. This plane or line is perpendicular to the movement vector of the apparatus which receives the wireless signal at the moment when the sign in the Doppler shift changes. This information may be used in order to identify the spatial position at which the transmitter is located.

The signal processor, the position acquisition device and/or the position estimator may be realized at least in part by one or more processing units or CPU. Each of the devices may comprise instructions that cause the respective device to perform the respective operations. In this way, the signal processor may perform operations to determine the Doppler shift in the received signal and to identify the change of the sign in the Doppler shift. The position acquisition device may perform operations for acquiring the navigation data is the point of time when the sign in the Doppler shift changes. The position estimator may perform operations to compute information relating to the spatial position of the transmitter.

Furthermore, the signal processor, the position acquisition device and/or the position estimator may also be software implemented at least in part. Thus, instructions may therefore be stored in a memory that is coupled to a general purpose processor, e.g. via a memory bus. The processor may further execute an operating system that loads and executes the instructions. The processor may e.g. be an Intel processor that runs a Windows or Linux operating system that loads and executes the respective instructions. In another embodiment, the processor may be a processor of a measurement device that may e.g. run an embedded operating system that loads and executes the instructions.

It is understood, that a single computer or processor may load and execute the instructions for each of the signal processor, the position acquisition device and the position estimator.

Further embodiments of the present invention are subject of the further subclaims and of the following description, referring to the drawings.

In a possible embodiment, the signal processor may be adapted to determine a frequency of the received wireless signal. The signal processor may be further adapted to determine the Doppler shift based on a difference between a predetermined frequency and the determined frequency.

Any kind of appropriate method for determining the frequency of the received by the signal may be possible. For example, the received signal may be converted to a digital signal, and the frequency may be determined in a digital domain. Furthermore, the received wireless signal may be filtered in advance or after converting the received by the signal to a digital signal. In particular, the filtering may comprise a low-pass filtering, high-pass filtering or a bandpass filtering. Accordingly, disturbances in the received by the signal may be eliminated.

The predetermined frequency may be a frequency of the wireless signal at the transmitter. The predetermined frequency may be specified in advance. For example, a fixed predetermined frequency may be used. Alternatively, it may be also possible to select a frequency out of a number of two or more frequencies. For example, the number of frequencies may be specified in a look-up table or in any other appropriate scheme. In an embodiment, it may be possible that the transmitter may use multiple frequency channels for transmitting a wireless signal. Accordingly, the predetermined frequency may be selected out of the frequencies corresponding to the respective channel currently used for transmission. Furthermore, the predetermined frequency may be also specified in any other appropriate way. For example, the predetermined frequency may be specified by a separate communication link, for example wired or wireless communication link. However, it may be also possible that the frequency used by the transmitter may be specified within the wireless signal emitted by the transmitter.

In a possible embodiment, the acquired navigation data may relate to a point of time when the sign in the Doppler shift changes from a negative Doppler shift to a positive Doppler shift.

As already mentioned above, the Doppler shift may be the difference between the frequency at the transmitter and the frequency at the receiver. Accordingly, as long as the distance between the transmitter and receiver decreases, e.g. the receiver moves towards the transmitter, the Doppler shift is negative. When the distance between the transmitter and receiver increases, e.g. the receiver moves away from the transmitter, the Doppler shift is positive. Accordingly, the sign in Doppler shift changes from a negative value to positive value at the position when the receiver is closest to the transmitter. Accordingly, it may be assumed that the transmitter is on a plane or a line perpendicular to the motion vector of the receiver at the point of time when the sign of the Doppler shift changes from negative to positive.

In a possible embodiment, the wireless signal may comprises a radio frequency signal.

In particular, the wireless signal may be any kind of radio-frequency signal emitted, for instance, by a communication device, a radio beacon, an interfering or jamming transmitter, or any other kind of device which may emit wireless radio-frequency signals. Alternatively, the wireless signal may be an acoustic signal, for example in a frequency range of sonic or ultrasonic waves, or the wireless signal may be an optical signal, in particular an optical signal modulated by a predetermined frequency.

In a possible embodiment, the position acquisition device may comprise at least one of a global navigation satellite system, an acceleration sensor, a velocity sensor, a compass and a gyroscope.

The global navigation satellite system (GLASS) may be, for example, global positioning system (GPS), Galileo, GLONASS or Beidou. However, any other navigation system, in particular any other kind of satellite-based navigation system may be also possible. It is understood, that any other appropriate system for determining a spatial position of the apparatus, in particular of the receiver may be also used. Furthermore, a motion vector of the apparatus, in particular the receiver may be determined based on a change of the determined positions. However, it may be also possible to determine a motion of the apparatus, in particular of the receiver based on a measured acceleration or any other kind of sensor data. In particular, the motion of the apparatus may be specified by two-dimensional or three-dimensional motion vector.

In a possible embodiment, the navigation data may comprise a three-dimensional motion vector of the apparatus.

The three-dimensional motion vector may be specified, for example in a Cartesian coordinate system or in any other appropriate manner. The motion vector may comprise at least a direction for specifying the movement of the apparatus, in particular the receiver. Furthermore, the motion vector may also comprise a speed (corresponding to a length of the vector) of the apparatus.

In a possible embodiment, the navigation data may comprise a position on a two-dimensional map.

In particular, the two-dimensional map may be a map for specifying a ground plane. In this case, the apparatus, in particular the receiver may move on this ground plane or move in a space over this ground plane. In particular, it is assumed that if the transmitter is located on this ground plane, is sufficient to consider the two-dimensional map for specifying the ground.

Alternatively, the navigation data may also comprise a navigation map in a three-dimensional space. In this case, it may be also possible to determine a spatial position of the transmitter in the three-dimensional space, in particular even at a position in an arbitrary height over ground.

In a possible embodiment, the acquired navigation data may comprise a timestamp for specifying the point of time when the sign of the Doppler shift changes.

The timestamp may comprise, for example, a timestamp from a real-time clock, an internal counter or any other appropriate time base source. In particular, the timestamp may comprise time information in a resolution of seconds, milliseconds, microseconds or even more a precise unit. By assigning the timestamp to the acquired data, the processing of the acquired data may be easily performed at a later point of time. Furthermore, the acquired data may be put in an appropriate order to consider a movement of the transmitter during the data acquisition procedure.

In a possible embodiment, the apparatus may further comprise a memory. The memory may be adapted to store the navigation data acquired by the motion detector. The position estimator may be adapted to compute the information relating to the spatial position of the transmitter based on the navigation data stored in the memory.

By storing the navigation data of at least two positions where the sign in the Doppler shift changes, the spatial position of the transmitter can be further determined. For example, navigation data of at least two positions may be used for determining a position on the two-dimensional plane or map. Furthermore, by using the navigation data of at least three different positions, it is even possible to determine the spatial position of the transmitter in three-dimensional space. However, it is understood, that by using the navigation data of even more positions where the sign in the Doppler shift changes, the accuracy of the spatial position of the transmitter can be further improved. Accordingly, by storing the respective data in a memory, the data may be used for computing the spatial position of the transmitter online or at a later point of time.

Furthermore, the acquired navigation data may be transmitted to an external processing device by a wireless or wired communication link. In particular, the acquired navigation data stored in the memory may be transferred to the external processing device for further analysis.

The analysis of the acquired navigation data may be performed, for example by a triangulation algorithm or any other appropriate scheme for computing the spatial position of the transmitter.

In a possible embodiment, the apparatus comprises a moving platform. The moving platform may be adapted to carry the receiver. The position acquisition device may be adapted to acquire the navigation data relating to the moving platform carrying the receiver.

The carrying platform may be, for example a drone or another highly moveable platform, in particular a highly moveable airborne platform. The carrying platform may further be a satellite, an aircraft, a vehicle, a ship or any other appropriate device for moving around the receiver. Furthermore, the carrying platform may also carry one or more of the further devices of the apparatus.

By moving around the receiver, the receiver may be located at different spatial positions, and the speed, the moving direction or any other parameter for moving around the receiver may be set up accordingly. By moving the receiver with an appropriate speed, a Doppler effect of the wireless signal can be achieved and thus, the Doppler shift may be analyzed in order to identify spatial positions where the sign of the Doppler shift changes. In particular, multiple different spatial positions and different moving directions (motion vectors) can be achieved for determining the spatial position of the transmitter.

In a possible embodiment, the apparatus may comprise a display. The display may be adapted to display the information relating to the spatial position of the transmitter.

By providing the respective information on the display, a user may easily grasp the acquired information in order to recognize or at least estimate possible positions of the transmitter. In this way, the results of the position acquisition process performed by apparatus may be easily provided to a user.

In a possible embodiment, the display may be adapted to display a position of the transmitter. In particular, the display may be adapted to display the position on a map or another representation of the environment.

For example, a map may be displayed on the display, and the display map may be overlaid with an indication for showing the position of the transmitter on the map. For example, the position of the transmitter may be displayed by a circle, an arrow or another graphical element. In particular, the graphical element may be displayed with a predetermined color. However, any other manner for displaying the position of the transmitter on the map or the representation of the environment may be possible, too.

In a possible embodiment, the display may be adapted to display a graphical representation of the Doppler shift.

The graphical representation may be provided, for example, by different colors for a positive and a negative Doppler shift. Additionally or alternatively, it may be also possible to use different signs for positive and negative Doppler shift, different line styles for positive and negative Doppler shift or any other appropriate modification of the representation for the positive and negative Doppler shift. In this way, a change of the sign in the Doppler shift can be easily visualized by a minimum amount of computational effort.

In a possible embodiment, the graphical representation may be adapted based on a magnitude of the Doppler shift.

For example, the magnitude of the Doppler shift may be provided by adapting color, brightness, thickness of a line or any other parameter of the representation of the Doppler shift. Accordingly, the magnitude of the Doppler shift may be used to evaluate the speed of the receiver with respect to the transmitter. In particular, it may be even possible to identify a moving transmitter by analyzing the magnitude of the Doppler shift.

In a possible embodiment, the display may be adapted to display a history of a course of the moving platform over ground. In particular, a representation of the history of the course over ground may be adapted based on the Doppler shift of the respective position. The course may be displayed by overlaying a map or another representation of the environment.

For example a track of the moving platform may be displayed on a map. The color, the thickness, the line style or another parameter of the track may be adapted depending on the corresponding Doppler shift. For example a positive Doppler sift may be displayed with a first style parameter and a negative Doppler shift may be displayed with another style parameter. Furthermore, the style may be adapted depending of a magnitude of the Doppler shift.

In a possible embodiment, the display may be adapted to display a history of the Doppler shift.

For example, a track of the movement of the receiver may be displayed on a map. The map may be represent the environment of the receiver. In particular, any kind of appropriate map may be used. However, it may be possible to provide representation of the movement of the receiver over ground without overlaying data of a map.

By displaying the historic data of the acquired Doppler shift, a very detailed representation of the changes the Doppler shift, in particular a change of the sing in the Doppler shift may be provided. Such representation may be used as a basis which can be easily processed for evaluating or estimating the spatial position of the transmitter.

With the present invention it is therefore now possible obtain a data basis for determining a spatial position of a transmitter with respect to a receiver, when the receiver is moving relative to the transmitter. By analyzing only the sign in the Doppler shift of a wireless signal, it is possible to obtain information with respect to the spatial position of the transmitter in a very easy and efficient manner. In particular, when taking into account the point of time and the moving direction of the receiver at the point of time when the sign in the Doppler shift changes, information regarding the position of the transmitter can be obtained in very easy and efficient way.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DETAILED DESCRIPTION OF THE DRAWINGS

Figure 1:
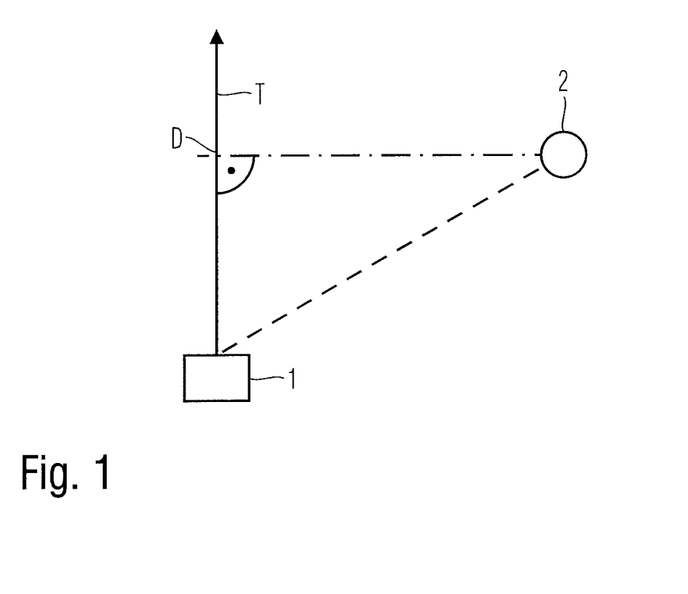
FIG. 1 shows a schematic diagram of an arrangement for determining a spatial position of a transmitter according to an embodiment of the present invention.

FIG. 1 shows schematic drawing of an arrangement for determining a spatial position of a transmitter 2. The transmitter 2 emits wireless signals, for example wireless radio frequency signals. The wireless radio frequency signals may be, for example radio-frequency signals from a wireless communication device such as a mobile phone or the like. Furthermore, transmitter 2 may be a jamming or interfering transmitter, a radio beacon or any other kind of radio frequency transmitting device. It may be also possible that transmitted 2 may emit wireless signals in sonic or ultrasonic frequency range. Transmitter 2 may also transmit optical signals, in particular modulated optical signals. For example, the optical signals may be modulated with a predetermined frequency.

The wireless signals from transmitter 2 may be received by apparatus 1 comprising a receiver for receiving the wireless signal transmitted by transmitter 2.

Apparatus 1 may move along a predefined track. For example, apparatus 1 may move with the constant or at least almost constant speed in predetermined direction. Accordingly, apparatus 1 moves relative to transmitter 2. The signal transmitted by transmitter 2 may have a predetermined frequency. Due to the movement of apparatus 1 with respect to transmitter 2, the frequency of the received wireless signal may be different from the frequency of the signal transmitted by transmitter 2. This effect is known as Doppler Effect. Accordingly, there exists a frequency shift known as Doppler shift which can be determined as the difference between the transmitted signal and the received signal. Thus, if the receiver of apparatus 1 moves in such a way that the distance between the apparatus 1 and the transmitted to decreases, the frequency of the signal received at apparatus 1 is higher than the frequency of the signal transmitted by transmitter 2. Consequently, the Doppler shift is negative. If apparatus 1 moves in such a way that the distance between the apparatus 1 and the transmitter 2 increases, the frequency of the signal received by apparatus 1 is lower than the frequency of the signal transmitted by transmitter 2. In this case, the Doppler shift is positive. Accordingly, there exists a position D on a track T of moving apparatus 1 where the sign in the Doppler shift changes from negative to positive. At this position D, the distance between apparatus 1 and the transmitter 2 is smallest, and transmitter 2 may be on a plane which is perpendicular to the direction of the movement of apparatus 1.

Figure 2:
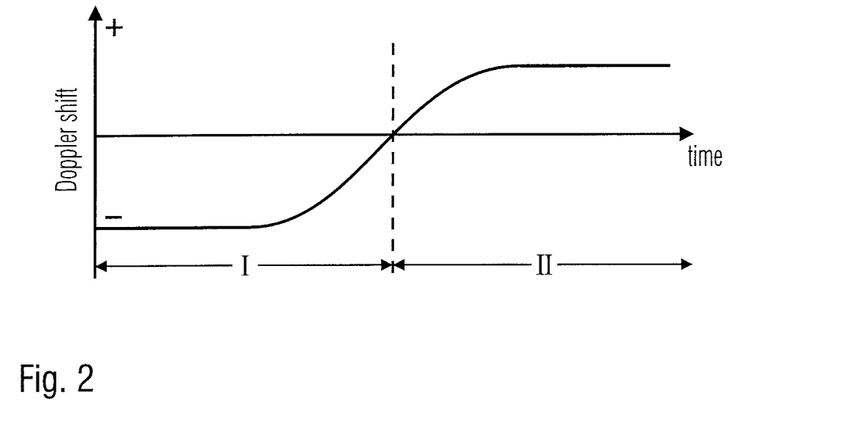
FIG. 2 shows a schematic diagram of a Doppler shift according to an embodiment of the present invention.

FIG. 2 shows a diagram of a Doppler shift of the signals received by apparatus 1 when apparatus 1 is moving relative to transmitter 2. The first section I, apparatus 1 is moving such that the distance between apparatus 1 and the transmitted 2 decreases, and consequently, the Doppler shift is negative. In section II, apparatus 1 is moving such that the distance between apparatus 1 and the transmitter 2 increases, and consequently, the Doppler shift is positive. Hence, the sign in the Doppler shift changes between section I and section II.

Figure 3:
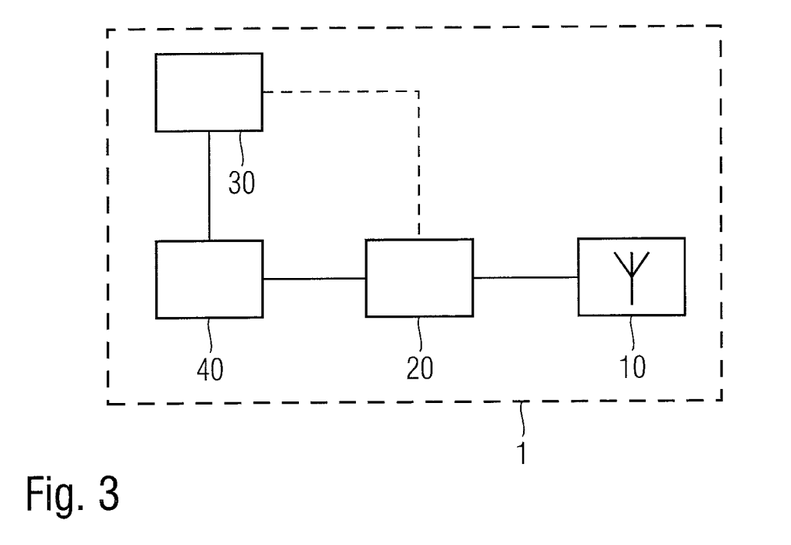
FIG. 3 shows a block diagram of an apparatus for determining a spatial position of a transmitter according to the present invention.

FIG. 3 shows a block diagram of an apparatus 1 for determining a spatial position of the transmitter 2. Apparatus 1 comprises a receiver 10, a signal processor 20, a position acquisition device 30 and the position estimator 40. Furthermore, apparatus 1 may comprise a moving platform for carrying at least receiver 10. However, the moving platform may also carry further devices, for example the signal processor 20, the position acquisition device 30 and the position estimator 40. The moving platform may be, for example a satellite, an aircraft, a vehicle or a ship. However, any other kind of moving platform for carrying the components of apparatus 1 may be also possible. The moving platform may be a platform which may be controlled by the user or a fully or partially autonomous moving platform.

Receiver 10 of apparatus 1 may receive wireless signals from transmitter 2. For this purpose, receiver 10 may comprise appropriate elements for receiving the respective wireless signals. In case transmitter 2 emits wireless radio frequency signals, receiver 10 may comprise an antenna for receiving the respective wireless signals. The antenna may be any appropriate antenna for receiving wireless signals in the respective frequency range. For example, the antenna may be an omnidirectional antenna. However, any other kind of antenna may be also possible. Furthermore, receiver 10 may comprise additional elements such as an amplifier, an attenuator, a filter or any other appropriate element for adapting the received wireless signal. In particular, the antenna of receiver 10 may be directly connected to the receiver 10 by an appropriate connector. Alternatively, it may be also possible to connect the cable between the antenna and a further element of the receiver 10. Receiver 10 may comprise a further connector for connecting the receiver 10 with signal processor 20.

Signal processor 20 may receive the signal corresponding to the wireless signals received by receiver 10. Signal processor 20 may receive the signal which is an analogue signal. Further, signal processor 20 may comprise an analog-to digital converter for converting the received analog signal to a digital signal and for further processing the converted signal in a digital domain.

Alternatively, it may be also possible that receiver 10 comprises analogue to digital converter for converting the received wireless signals in a digital signal. In this case, the signal processor 20 may receive the signal in a digital form.

Signal processor 20 may process the received signal in order to determine a Doppler shift in the received signal. For this purpose, the signal processor 20 may determine a frequency of the received signal. The determined frequency may be compared with a specified frequency in order to determine a deviation between the specified frequency and the determined frequency of the received signal. Accordingly, a Doppler shift can be determined as described above. The specified frequency may be a fixed predetermined frequency. However, it may be also possible that the specified frequency may be adapted. For example, transmitter 2 may emit wireless signals relating to multiple channels, each channel referring to a different frequency. In this case, the signal processor 20 may determine the frequency which refers to the transmission channel currently used by transmitter 2 and determine the Doppler shift based on the respective frequency. Furthermore, any other appropriate scheme for determining the frequency used by transmitter 2 may be also possible. For example, the wireless signal transmitted by the transmitter may comprise information for specifying the respective frequency, or the frequency of the wireless signal may be specified via another communication link to apparatus 1.

By determining the Doppler shift of the received wireless signal, signal processor 20 may identify a change of the sign in the determined Doppler shift. As already explained above, at the moment when the sign in the Doppler shift changes, transmitter 2 is located on a plane which is perpendicular to the direction of the movement of apparatus 1. Accordingly, this information may be used in order to determine the spatial position of transmitter 2.

For this purpose, navigation data may be acquired by position acquisition device 30. The navigation data may comprise, for example, a direction of the movement of apparatus 1. This direction of the movement of apparatus 1 may be specified, for example by a three-dimensional vector. Furthermore, the navigation data may also comprise a speed of apparatus 1, an acceleration of apparatus 1 or any other data for characterizing the movement of apparatus 1. Furthermore, the navigation data may also comprise a position of apparatus 1 at the moment when the sign in the Doppler shift changes.

In order to determine the navigation data, position acquisition device 30 may comprise a receiver of a global navigation satellite system (GNSS), for example a global positioning system (GPS) receiver. However, it is understood, that any other GNSS may be also possible. Accordingly, the spatial position of apparatus 1 can be determined. For example, a position in a three-dimensional space may be determined. However, it may be also possible that the position may be specified by coordinates of a two-dimensional map, for example on a plane over ground.

Furthermore, by analyzing successively determined positions of apparatus 1, it may be possible to determine a moving direction of apparatus 1. However, the movement of apparatus 1 may be also determined based on any other appropriate measure. For example, additional sensors such as an acceleration sensor, a speed sensor, a compass, a gyroscope or any other kind of appropriate sensor for determining the movement of apparatus 1 may be used. Accordingly, a motion vector for specifying the direction of movement of apparatus 1 may be obtained. Further to the direction, the motion vector may also specify a speed of apparatus 1, i.e. a length of the motion vector.

Additionally, it may be also possible to acquire a detailed point of time when the sign in the Doppler shift changes. This point of time may be assigned to the acquired navigation data. For example, a timestamp relating to a real-time clock or an internal counter may be used for specifying the point of time when the signed the Doppler shift changes.

Based on the acquired navigation data, position estimator 40 may compute information relating to the spatial position of transmitter 2. As already explained above, this information may comprise data for specifying a plane in a three-dimensional space on which the transmitter 2 may be located. Alternatively, if only a two-dimensional plane over ground is considered, the information may specify a line perpendicular to the moving direction of apparatus 1 on which the transmitter 2 may be located. However, it is understood, that any other kind of information which may be derivable from the navigation data based on the point of time when the sign in the Doppler shift changes.

Accordingly, the information which has been generated by position estimator 40 may be used in order to identify a position of transmitter 2. For this purpose, the computed information may be provided to a user or forwarded to an additional system for analyzing the information provided by position estimator 40.

Figure 4:
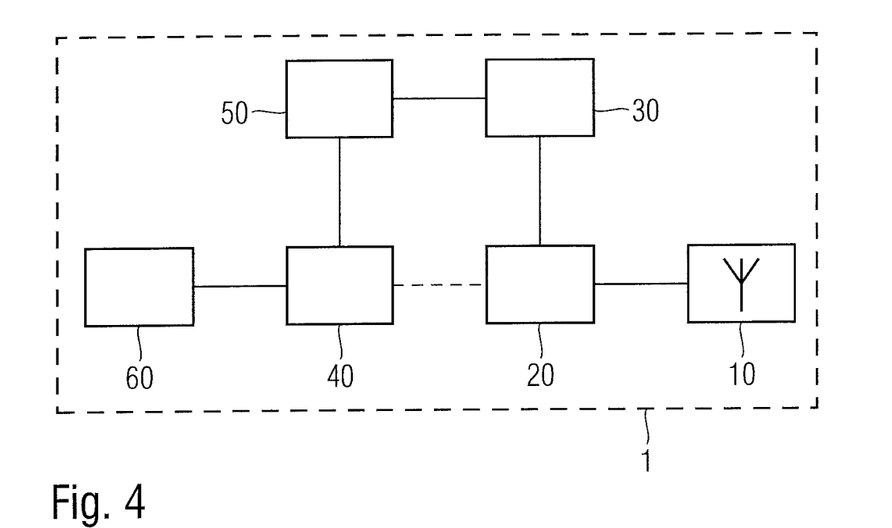
FIG. 4 shows a block diagram of another apparatus for determining a spatial position of a transmitter according to the present invention.

FIG. 4 shows a block diagram of a further embodiment of an apparatus 1 for determining a spatial position of transmitter 2. The embodiment according to FIG. 4 in substance corresponds to the embodiment previously described in connection with FIG. 3. Apparatus 1 may further comprise a memory 50 for storing the acquired navigation data. Additionally or alternatively, apparatus 1 may comprise a display 60 for displaying information relating to the spatial position of transmitter 2.

Memory 50 may be adapted to store the acquired navigation information provided from position acquisition device 30. For this purpose, position acquisition device 30 may comprise an interface for forwarding the required navigation data to memory 50. The acquired navigation data may be stored in any appropriate manner. A timestamp may be assigned to each acquired navigation data. The timestamp may indicate the point of time when the sign in the Doppler shift changes and the navigation data are acquired.

Display 60 may be any kind of appropriate display for displaying the desired information. In particular, display 60 may provide information relating to the Doppler shift determined by signal processor 20. For this purpose, an appropriate information may be displayed on a position of display 60 which corresponds to a spatial position of apparatus 1. For example, the data provided on display 60 may be adapted depending on the determined Doppler shift. For example, a color, a brightness, a shape, a line style or any other kind of modification may be changed depending on the determined Doppler shift. In particular, at least one property may be changed depending on the sign of the Doppler shift. Furthermore, at least one parameter may be adapted in order to indicate a magnitude of the Doppler shift. It may be also possible to provide a line on the display which indicates appropriate positions at which a transmitter 2 may be expected. As already explained above, such a line may be perpendicular to the direction of the movement of apparatus 1.

Furthermore, it may be also possible to overlay any kind of data of a map representing the environment of apparatus 1.

In an example, historic data relating to the movement of apparatus 1 may be provided on display 60. For example, historic data may be read out from the memory 50 in order to provide a track illustrating the movement of apparatus 1.

Figure 5:
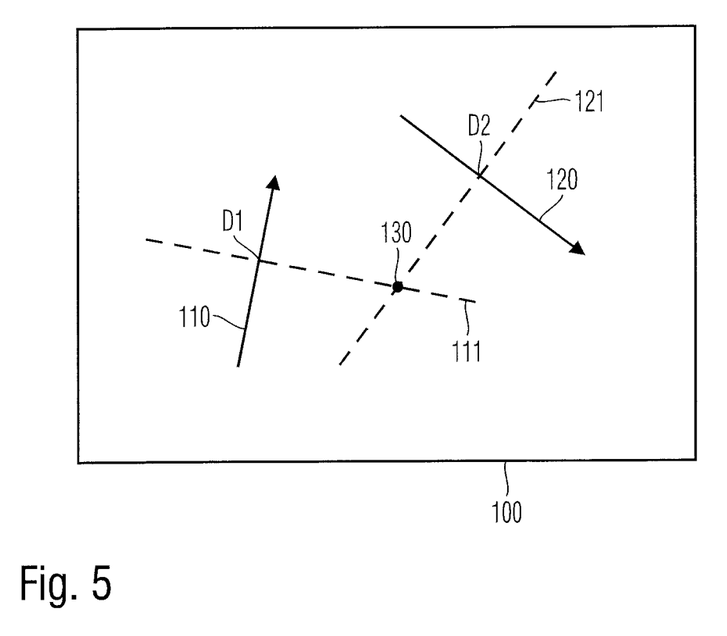
FIG. 5 shows an output on a display of an apparatus for determining a spatial position of a transmitter according to an embodiment of the present invention.

FIG. 5 shows a schematic representation 100 for providing information indicating a spatial position of a transmitter 2. Such as a presentation may be display, for instance, on a display 60 as described above.

As can be seen in FIG. 5, the representation 100 comprises a first track 110 indicating the first movement of apparatus 1. At the position D1, the sign of the Doppler shift changes. Accordingly, line 111 represents possible locations of a transmitter 2 based on the determined changing the sign of the Doppler shift. Furthermore, a second track 120 is shown with a second change D2 in the sign of the Doppler shift. Accordingly, line 121 represents further possible locations of transmitter 2. By combining the information of the two lines 111 and 121, it can be determined that transmitter may be located at a position 130.

For sake of clarity in the following description of the method based FIG. 6 the reference signs used above in the description of apparatus based FIGS. 1-5 will be maintained.

Figure 6:
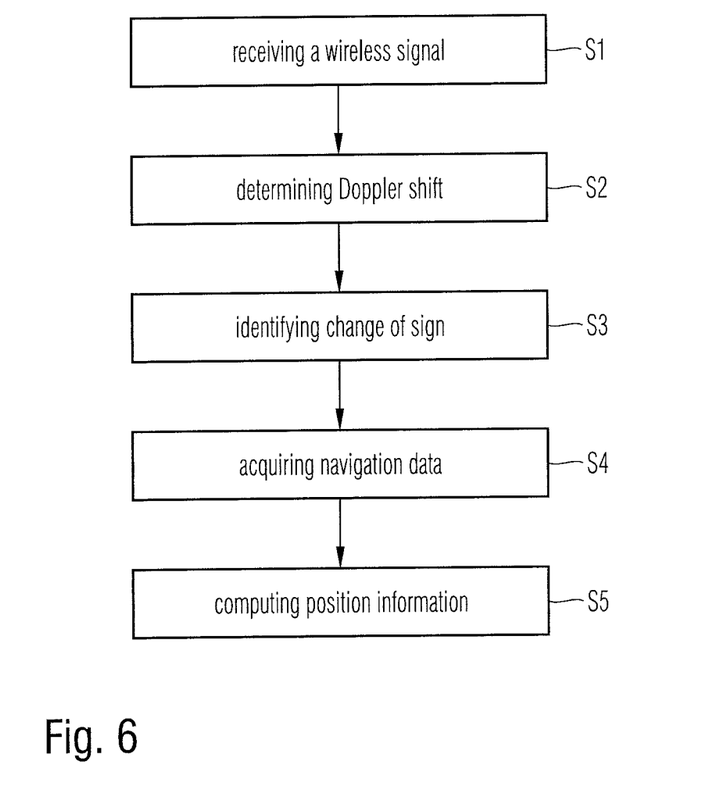
FIG. 6 shows a flow diagram of an embodiment of a method according to the present invention.

FIG. 6 shows a flow diagram of a method for determining a spatial position of a transmitter 2.

Transmitter 2 may move relative to the apparatus 1, and the transmitter 2 may emit a wireless signal. The wireless signal may be any kind of wireless signal as already described above. The method comprises a step S1 of receiving the wireless signal emitted by the transmitter 2. The signals may be received by the receiver 10 of apparatus 1. The method further comprises a step S2 for determining a Doppler shift in the received signal, and a step S3 for identifying a change of sign in the determined Doppler shift. Steps S2 and S3 may be performed by signal processor 20. In a step S4 navigation data are acquired. The navigation data relate to a position and/or a movement of the apparatus 1 at a point of time when the sign in the determined Doppler shift changes. Navigation data may be acquired by a position acquisition device 30. In step S5 information relating to the spatial position of the transmitter 2 are acquired. The information are acquired with respect to the position of the apparatus 1 based on the acquired navigation data. Step S5 may be performed by a position estimator 40.

The method may further comprise storing the navigation data acquired by the motion detector in a memory 50. The computing of the information relating to the spatial position of the transmitter may comprise computing the information based the navigation data stored in the memory 50.

The method may comprise assigning a timestamp to the acquired navigation data specifying the point of time when the sign of the Doppler shift changes.

The method may comprise displaying a graphical representation of the Doppler shift on a display 60.

The displaying the graphical representation may comprise displaying a line perpendicular to a motion vector of the receiver at the time when the sign in the Doppler shift changes.

The method may further comprise displaying a history of the Doppler shift on a map.

Summarizing, the present invention relates to a determination of a spatial position of a transmitter which emits a wireless signal. A receiver which moves relative to the transmitter receives the wireless signal and analyses a Doppler shift in the received signal. Information is generated for specifying possible spatial positions of the transmitter based on a point of time when a sign in the Doppler shift changes. In this way, a very simple and efficient determination of possible locations of the transmitter can be obtained.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

The invention claimed is:

1. An apparatus for determining a spatial position of a transmitter, wherein the transmitter moves relative to the apparatus and the transmitter emits a wireless signal, the apparatus comprising:
   a receiver configured to receive the wireless signal emitted by the transmitter;
   a signal processor configured to determine a Doppler shift in the received signal and to identify a change of sign in the determined Doppler shift;
   a position acquisition device configured to acquire navigation data relating to a position and/or a movement of the apparatus at a point of time when the sign in the determined Doppler shift changes; and
   a position estimator configured to compute information relating to the spatial position of the transmitter with respect to the position of the apparatus based on the acquired navigation data,
   a memory configured to store the acquired navigation data,
   wherein the acquired navigation data comprise a timestamp specifying the point of time when the sign of the Doppler shift changes,
   wherein the acquired navigation data are put in an order to a movement of the transmitter during a data acquisition procedure, and the computation of information relating to the spatial position of the transmitter is stored in the memory to be performed at a later point in time, and
   wherein the position estimator is configured to compute for each acquired point in time when the sign in the determined Doppler shift changes a line or plane which is perpendicular to a movement vector of the receiver at the point in time when the sign in the determined Doppler shift changes, and identify a position of the transmitter by combining multiple of the computed lines or planes.

2. The apparatus according to claim 1, wherein the signal processor is configured to determine a frequency of the received wireless signal and to determine the Doppler shift based on a difference between a predetermined frequency and the determined frequency.

3. The apparatus according to claim 1, wherein the acquired navigation data relate to a point of time when the sign in the Doppler shift changes from a negative Doppler shift to a positive Doppler shift.

4. The apparatus according to claim 1, wherein the wireless signal comprises a radio frequency signal.

5. The apparatus according to claim 1, wherein the position acquisition device comprises at least one of a global navigation satellite system, an acceleration sensor, a velocity sensor, a compass and a gyroscope.

6. The apparatus according to claim 1, wherein the navigation data comprise a three-dimensional motion vector of the apparatus.

7. The apparatus according to claim 1, wherein the navigation data comprise a position on a two-dimensional map.

8. The apparatus according to claim 1,
wherein the position estimator is configured to compute the information relating to the spatial position of the transmitter based the navigation data stored in the memory.

9. The apparatus according to claim 1, comprising a moving platform configured to carry the receiver;
wherein the position acquisition device is configured to acquire the navigation data relating to the moving platform carrying the receiver.

10. The apparatus according to claim 1, comprising a display configured to display the information relating to the spatial position of the transmitter.

11. The apparatus according to claim 10, wherein the display is configured to display a graphical representation of the Doppler shift.

12. The apparatus according to claim 11, wherein the graphical representation is adapted based on a magnitude of the Doppler shift.

13. The apparatus according to claim 10, wherein the display is configured to display a history of the Doppler shift.

14. A method for determining a spatial position of a transmitter, wherein the transmitter moves relative to the apparatus and the transmitter emits a wireless signal, the method comprising:
  receiving, by a receiver, the wireless signal emitted by the transmitter;
  determining a Doppler shift in the received signal by a signal processor;
  identifying a change of sign in the determined Doppler shift by the signal processor;
  acquiring, by a position acquisition device, navigation data relating to a position and/or a movement of the apparatus at a point of time when the sign in the determined Doppler shift changes;
  computing information relating to the spatial position of the transmitter with respect to the position of the apparatus based on the acquired navigation data by a position estimator,
  computing for each acquired point in time when the sign in the determined Doppler shift changes a line or plane which is perpendicular to a movement vector of the receiver at the point in time when the sign in the determined Doppler shift changes, and
  identifying a position of the transmitter by combining multiple of the computed lines or planes,
  storing the acquired navigation data in a memory,
  wherein the acquired navigation data comprise a time-stamp specifying the point of time when the sign of the Doppler shift changes, and
  wherein the acquired navigation data are put in an order to identify a movement of the transmitter during a data acquisition procedure, and the computation of information relating to the spatial position of the transmitter is stored in the memory and performed at a later point in time.

15. The method according to claim 14, wherein the computing the information relating to the spatial position of the transmitter comprises computing the information based the navigation data stored in the memory.

16. The method according to claim 14, comprising displaying a graphical representation of the Doppler shift on a display.

17. The method according to claim 16, wherein the displaying the graphical representation comprises displaying a line perpendicular to a motion vector of the receiver at the time when the sign in the Doppler shift changes.

18. The method according to claim 16, comprising displaying a history of the Doppler shift on a map.

* * * * *